(12) United States Patent
Yeo et al.

(10) Patent No.: US 12,280,691 B2
(45) Date of Patent: Apr. 22, 2025

(54) SYSTEM AND METHOD FOR CHARGING BATTERY OF VEHICLE

(71) Applicants: HYUNDAI MOTOR COMPANY, Seoul (KR); KIA CORPORATION, Seoul (KR)

(72) Inventors: In Yong Yeo, Bucheon-si (KR); Youn Sik Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 665 days.

(21) Appl. No.: 17/697,218

(22) Filed: Mar. 17, 2022

(65) Prior Publication Data
US 2023/0024016 A1 Jan. 26, 2023

(30) Foreign Application Priority Data
Jul. 22, 2021 (KR) .......................... 10-2021-0096611

(51) Int. Cl.
*H02J 7/00* (2006.01)
*B60L 50/64* (2019.01)
*B60L 53/80* (2019.01)
*B60L 58/12* (2019.01)
*H02J 7/34* (2006.01)

(52) U.S. Cl.
CPC ............... *B60L 53/80* (2019.02); *B60L 50/64* (2019.02); *B60L 58/12* (2019.02); *H02J 7/007182* (2020.01); *H02J 7/342* (2020.01); *H02J 2207/40* (2020.01)

(58) Field of Classification Search
USPC ................. 320/106, 107, 108, 109, 110, 112
See application file for complete search history.

(56) References Cited

U.S. PATENT DOCUMENTS

| 2013/0093394 A1* | 4/2013 | Iyasu | .......................... H02J 7/04 320/109 |
| 2016/0342182 A1* | 11/2016 | Deboy | ..................... G06F 1/305 |
| 2016/0365794 A1* | 12/2016 | Lawson | ..................... H02J 3/32 |

FOREIGN PATENT DOCUMENTS

KR 10-1795080 B1 11/2017

* cited by examiner

*Primary Examiner* — Brian Ngo
(74) *Attorney, Agent, or Firm* — MCDONNELL BOEHNEN HULBERT & BERGHOFF LLP (57) ABSTRACT

The present disclosure relates to a charging system and a charging method for charging a main battery of a vehicle. The main battery can be charged with a voltage of a swappable battery using a DC-DC converter of an on-board computer (OBC) without installing additional converters for a plurality of swappable batteries through connection of the plurality of swappable batteries to input terminals of a plurality of DC-DC converters of the OBC charging the main battery, so that a driving distance of the vehicle is increased, and the efficiency of a motor and the inverters is increased.

14 Claims, 6 Drawing Sheets

SYSTEM AND METHOD FOR CHARGING BATTERY OF VEHICLE

CROSS REFERENCE TO RELATED APPLICATIONS

The present application claims priority of Korean Patent Application No. 10-2021-0096611 filed on Jul. 22, 2021, the entire contents of which is incorporated herein for all purposes by this reference.

BACKGROUND

Field

The present disclosure relates to a system and a method for charging a main battery of a vehicle, and more particularly, to a system and a method for charging a main battery of a vehicle, which can charge a main battery of a vehicle using not only an external AC power but also swappable batteries built in the vehicle.

Description of the Related Art

An eco-friendly vehicle provided with a battery as an energy source of a driving motor in a vehicle, such as an electric vehicle or a plug-in hybrid electric vehicle, has an on-board charger for converting an external AC power into a DC power and charging the battery with the DC power.

Meanwhile, the price of a high-voltage battery greatly exerts an influence on the cost competitiveness of an eco-friendly vehicle, and in order to minimize the price of such a high-voltage battery, technology development has been made in the direction of reducing the capacity and lowering the voltage of the battery. However, such capacity reduction of the high-voltage battery has the problem in that the driving distance of the vehicle is reduced and the motor/inverter output is reduced.

In order to solve the above-described problem, a scheme has been proposed to install one or a plurality of swappable batteries inside the vehicle and to charge a main battery using the one or the plurality of swappable batteries.

The main battery and the swappable batteries may have the same maximum voltages, but have voltages in flexible ranges depending on the status of charge (SOC). Accordingly, if they are connected in a simple short-circuited structure, there is a risk of fire and component burnout due to voltage differences. Accordingly, in order to charge the main battery using the swappable batteries, it is general that one DC-DC converter is additionally necessary for one swappable battery, and this causes the cost and the size of the battery to be increased and causes the efficiency to be degraded. Accordingly, there is a need for a converter control device to improve them.

The foregoing description of the background technology is intended merely to help the understanding of the background of the present disclosure, and is not intended to mean that the present disclosure falls within the purview of the related art that is already known to those of ordinary skill in the art.

SUMMARY

An aspect of the present disclosure is to provide a system and a method for charging a battery of a vehicle, which can charge a main battery with voltages of swappable batteries using DC-DC converters of an on-board computer (OBC) without installing additional converters for a plurality of swappable batteries through connection of the plurality of swappable batteries to input terminals of the plurality of DC-DC converters of the OBC charging the main battery.

The present disclosure is not limited to the above-described subject matters, and other subject matters may be derived from the following descriptions.

In one aspect of the present disclosure, a charging system of a vehicle includes a power factor correction unit receiving a commercial AC power being applied and correcting a power factor of the AC power, a plurality of link capacitors coupled to an output terminal of the power factor correction unit, a plurality of converters having input terminals connected to the link capacitors in a one-to-one correspondence, and converting voltages applied to the input terminals, a main battery being charged with powers converted by the plurality of converters, a plurality of swappable batteries connected to the input terminals of the converters using switches, and a controller applying voltages by the plurality of swappable batteries to the input terminals of the plurality of converters by controlling the switches of the plurality of swappable batteries depending on whether the commercial AC power is applied.

The plurality of converters may be DC-DC converters of which a topology can be modified in the form of a full bridge or a half bridge under the control of the controller.

The controller may control the plurality of converters to operate as half-bridge converters in case that the commercial AC power is applied to the plurality of converters.

The controller may control the plurality of converters to operate as full-bridge converters in case that the voltages of the plurality of swappable batteries are applied to the plurality of converters.

The power factor correction unit may have a structure of a boost converter, and the plurality of link capacitors may be connected in series with each other at an output terminal of the boost converter.

The power factor correction unit may have a structure of a plurality of buck converters, and the link capacitors may be connected to output terminals of the buck converters.

The controller may control the switches to be opened to charge the main battery with the commercial AC power in case that the commercial AC power is applied to the vehicle.

The controller may control the switches to be closed to charge the main battery through the plurality of swappable batteries in case that the commercial AC power is not applied to the vehicle.

The switches connected to the swappable batteries may include a plurality of relays, wherein the plurality of relays include a precharge relay having one end connected to an anode of the swappable battery and initially charging the plurality of link capacitors, a first main relay having one end connected to the anode of the swappable battery, and a second main relay having one end connected to a cathode of the swappable battery, and the first main relay and the second main relay apply the voltages of the swappable batteries to the input terminals of the converters under the control of the controller.

Outputs of the converters may be connected in parallel to the main battery.

The plurality of swappable batteries may include a plurality of swappable battery pairs, and the swappable batteries of the plurality of swappable battery pairs may have output terminals connected to one another, and the output terminals connected to one another may be connected to the input terminals of the converters.

The controller may make two swappable batteries of the swappable battery pairs alternately charge the main battery by alternately opening and closing the switches of the two swappable batteries.

In another aspect of the present disclosure, a method for charging a main battery of a vehicle includes determining, by a controller, whether a commercial AC power is applied to the vehicle; applying, by the controller, the commercial AC power to a plurality of converters by opening switches through which a plurality of swappable batteries are connected to a plurality of converters converting the commercial AC power into voltages for charging the main battery when it is determined that the commercial AC power has been applied to the vehicle; and applying, by the controller, the voltages of the swappable batteries to the plurality of converters by closing the switches when it is determined that the commercial AC power has not been applied to the vehicle.

The plurality of converters may be DC-DC converters of which a topology can be modified in the form of a full bridge or a half bridge under the control of the controller, and the applying the commercial AC power to the plurality of converters may include controlling, by the controller, the plurality of converters to operate as half-bridge converters, and the applying the voltages of the swappable batteries to the plurality of converters may include controlling, by the controller, the plurality of converters to operate as half-bridge converters.

Since it is possible to charge the main battery with the voltages of the swappable batteries using the DC-DC converters of the OBC without installing additional converters for the plurality of swappable batteries through connection of the plurality of swappable batteries to the input terminals of the plurality of DC-DC converters of the OBC charging the main battery, the driving distance of the vehicle is increased, and the efficiency of the motor and the inverters is increased.

BRIEF DESCRIPTION OF THE FIGURES

The above and other objects, features and advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

The present disclosure relates to a charging system and a charging method for charging a main battery of a vehicle using a swappable battery, and hereinafter, they may be simply referred to as a "charging system" and a "charging method".

Figure 1:
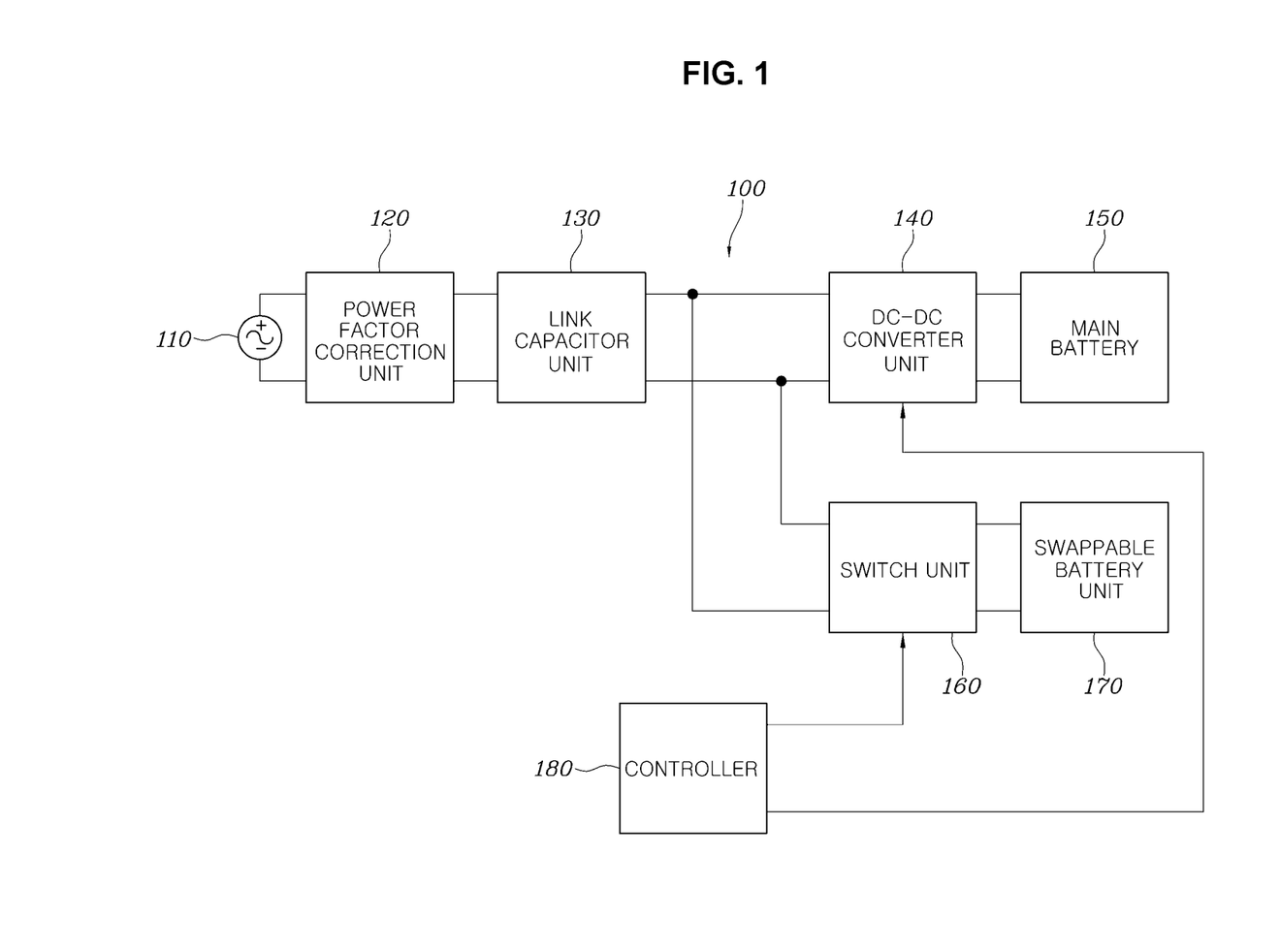
FIG. 1 is an overall block diagram of a charging system according to an embodiment of the present disclosure.

FIG. 1 is an overall block diagram of a charging system according to an embodiment of the present disclosure.

Referring to FIG. 1, a charging system 100 according to an embodiment of the present disclosure includes a power factor correction unit 120 receiving a commercial AC power 110 being applied from an outside and correcting a power factor of the AC power; a link capacitor unit 130 connected to an output terminal of the power factor correction unit 120, a DC-DC converter unit 140 having an input terminal connected to the link capacitor unit 130 and converting a voltage applied to the input terminal thereof, a main battery 150 being charged with the voltage converted by the DC-DC converter unit 140, a swappable battery unit 170 connected through a switch unit 160 between the link capacitor unit 130 and the DC-DC converter unit 140, and a controller controlling the DC-DC converter unit 140 and the switch unit 160 depending on whether the commercial AC power 110 is applied.

The power factor correction unit 120 is configured to correct the power factor of the commercial AC power 110 being applied from the outside and to output a corrected voltage, and may be composed of a single or a plurality of converters, and as needed, it is also possible to configure the power factor correction unit 120 as a bridgeless topology.

The link capacitor unit 130 is formed so that a plurality of link capacitors 131, 132, and 133 are connected to output terminals of the single or the plurality of converters of the power factor correction unit 120. In this case, in order to connect the DC-DC converter unit 140 composed of a plurality of DC-DC converters to a rear end of the power factor correction unit 120, it is preferable that the plurality of link capacitors 131, 132, and 133 have the same size.

The DC-DC converter unit 140 may be composed of a plurality of DC-DC converters converting the voltage applied to the input terminal into a voltage for charging the main battery 150 to output the converted voltage. In this case, it is preferable that an isolated converter is used as the DC-DC converter.

Further, in an embodiment of the present disclosure, if the DC-DC converter unit 140 is composed of a DC-DC converter of which a topology can be modified in the form of a full bridge or a half bridge, it may be possible to charge the main battery 150 more efficiently by modifying the topology depending on the kind of a charging source (i.e., external commercial AC power 110 or swappable batteries 171, 172, and 173) charging the main battery 150.

The swappable battery unit 170 may be composed of a plurality of swappable batteries 171, 172, and 173, and is connected between the link capacitor unit 130 and the DC-DC converter unit 140 through the switch unit 160. The swappable battery unit 170 is a voltage source for charging the main battery 150 when the main battery 150 is not charged by the commercial AC power 110. By controlling the switch unit 160 connected to the swappable battery unit 170, the voltage supply from the swappable battery unit 170 is controlled.

The controller 180 may change the topology of the DC-DC converter unit 140 by controlling an on/off state of switches constituting the DC-DC converter unit 140 depending on whether the commercial AC power 110 is applied, and may control the voltage supply from the swappable battery unit 170 by controlling an on/off state of the switch unit 160 of the swappable battery unit 170.

The controller 180 as described above may be implemented in the form of a microcomputer including a processor performing algorithm processing and computation required for the control and a memory storing information required for the algorithm processing and computation by the processor.

According to an embodiment of the present disclosure, the swappable battery unit 170 for charging the main battery 150 is not connected to the main battery 150 through a separate converter, but is connected to the main battery 150 through the DC-DC converter unit 140 converting the existing commercial AC power 110, and when the commercial AC power 110 is not applied, the DC-DC converter unit 140 converts the voltage from the swappable battery unit 170 and supplies the converted voltage to the main battery 150, so that the charging system is economical and has an excellent charging efficiency.

Hereinafter, respective configurations of the charging system according to the present disclosure will be described in detail through various embodiments.

Embodiment 1

Figure 2:
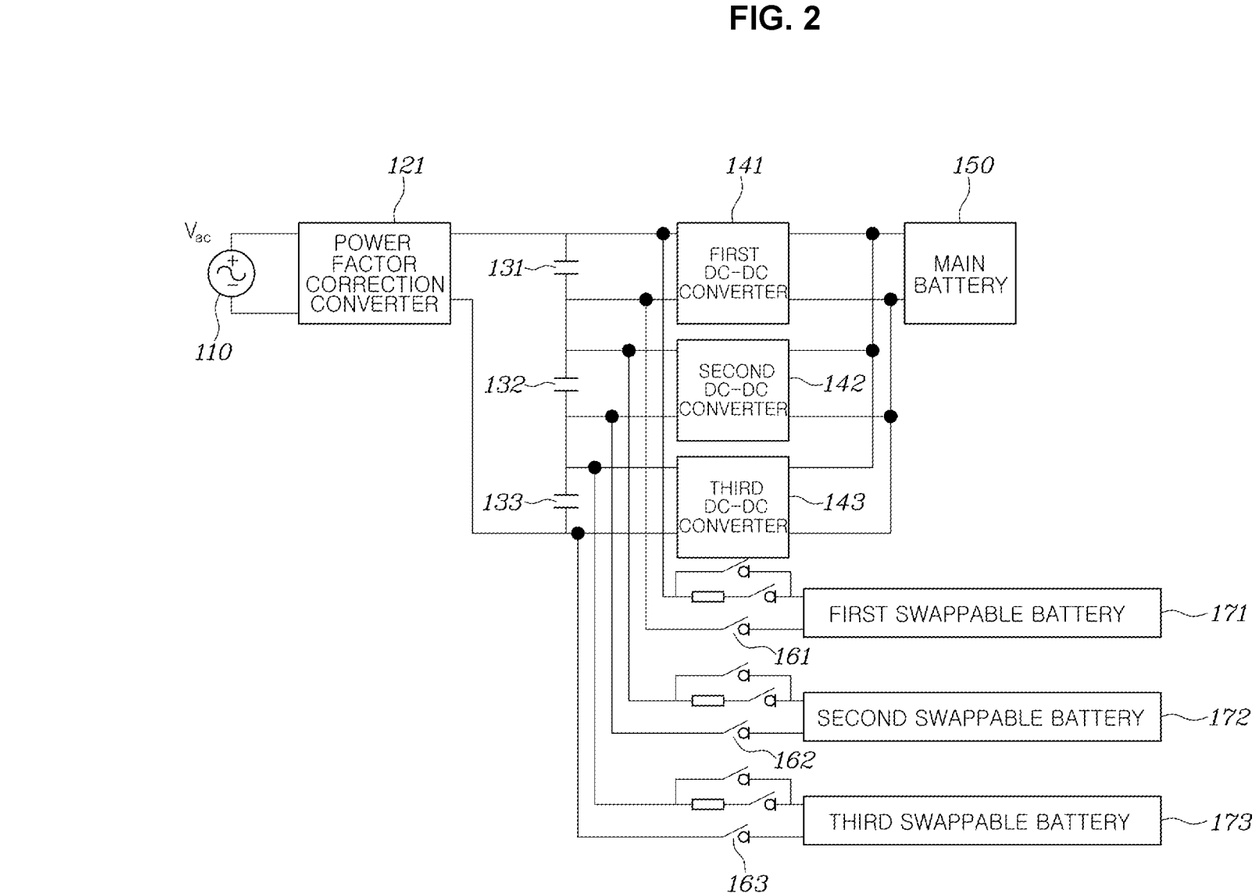
FIG. 2 is a diagram illustrating a charging system according to an embodiment of the present disclosure.

Embodiment 1 is an embodiment in which the power factor correction unit 120 of FIG. 1 is composed of a single converter. FIG. 2 is a diagram illustrating a charging system according to embodiment 1.

Referring to FIG. 2, a charging system according to an embodiment of the present disclosure is composed of a power factor correction converter 121, a plurality of link capacitors 131, 132, and 133, a plurality of DC-DC converters 141, 142, and 143, a main battery 150, a plurality of switches 161, 162, and 163, and a plurality of swappable batteries 171, 172, and 173.

The power factor correction converter 121 is configured as single boost converter topology. In an embodiment of the present disclosure, the power factor correction converter 121 may be configured as bridgeless topology. Such boost converter topology is advantageous since it can increase the power factor (PF), and can reduce the total harmonic distortion (THD).

The plurality of link capacitors 131, 132, and 133 have the same size, and are connected in series to an output terminal of the power factor correction converter 121. The link capacitors 131, 132, and 133 connected in series to one another can make the voltages be supplied stably to match the voltages of the swappable batteries 171, 172, and 173, respectively.

Figure 3:
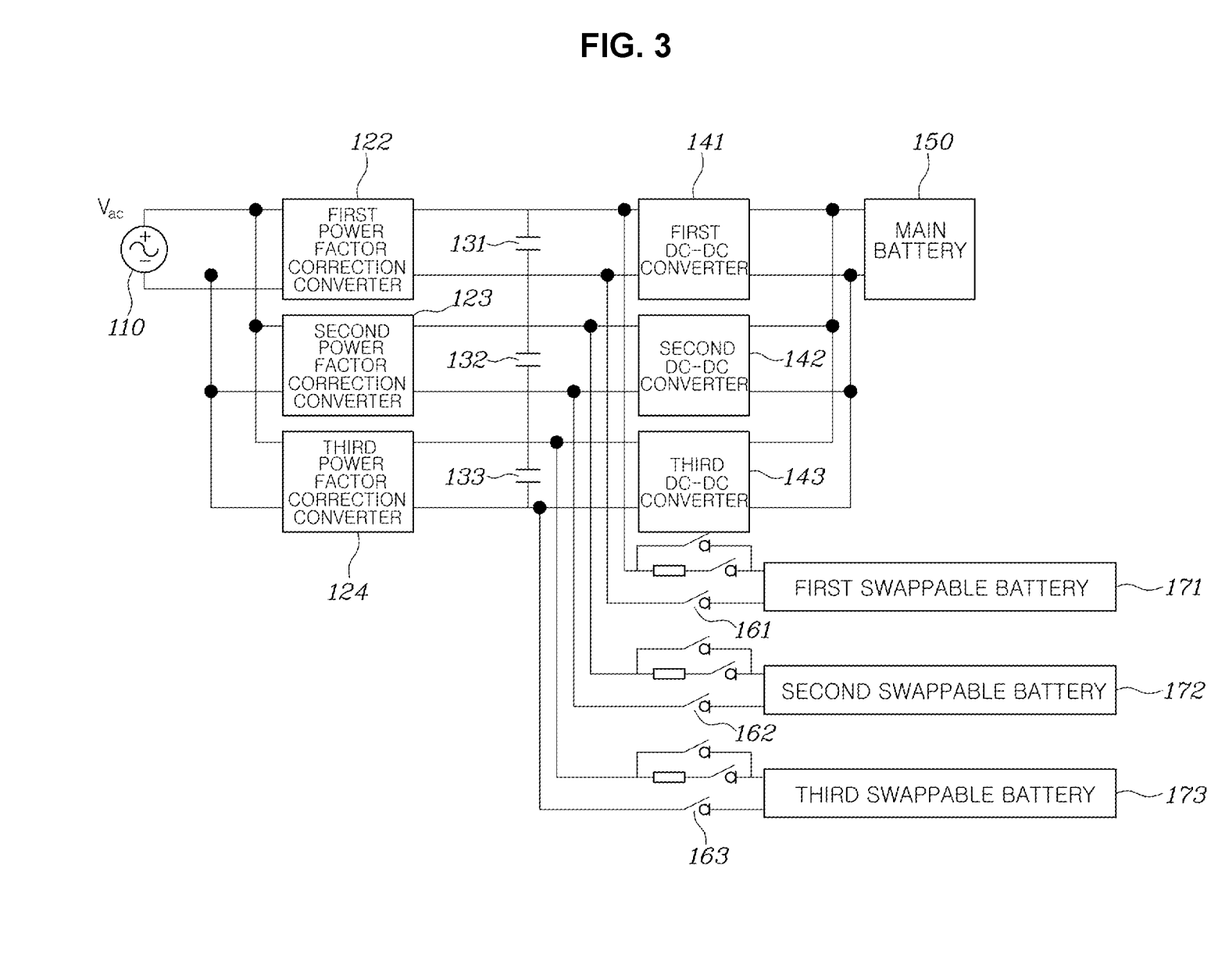
FIG. 3 is a diagram illustrating a charging system according to another embodiment of the present disclosure.

The plurality of DC-DC converters 141, 142, and 143 are connected in a one-to-one correspondence to the link capacitors 131, 132, and 133 so as to receive an input of the voltages of the plurality of link capacitors 131, 132, and 133 connected in series to one another. Referring to FIG. 3, since the first DC-DC converter 141 is connected to receive an input of the voltage being applied to the first link capacitor 131, the second DC-DC converter 142 is connected to receive an input of the voltage being applied to the second link capacitor 132, and the third DC-DC converter 143 is connected to receive an input of the voltage being applied to the third link capacitor 133, the link capacitors 131, 132, and 133 correspond to the DC-DC converters 141, 142, and 143 in a one-to-one manner. The outputs of the plurality of DC-DC converters 141, 142, and 143 are connected in parallel to one another, and are input to the input terminal of the main battery 150.

The plurality of DC-DC converters 141, 142, and 143 may be composed of DC-DC converters of which the topology can be modified in the form of a full bridge or a half bridge, and if a detailed circuit form can be modified in the form of a full bridge or a half bridge under the control of the controller, it can be properly selected and used by an ordinary skilled person.

Figure 4A:
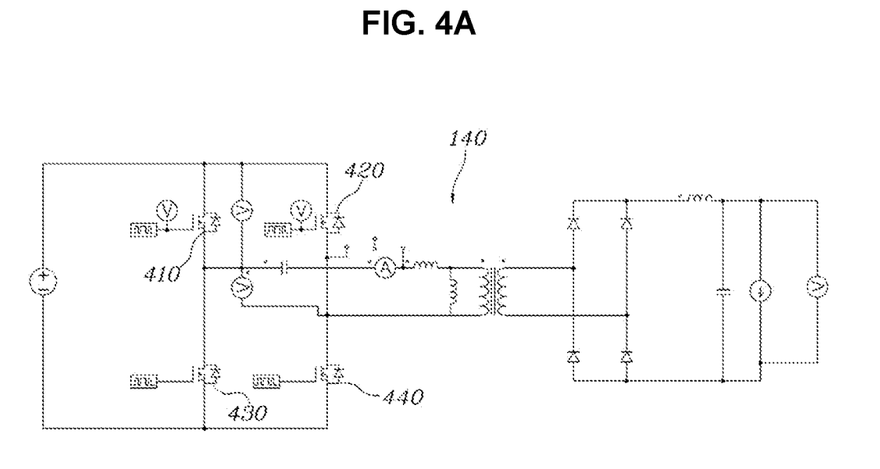
FIGS. 4A and 4B are diagrams explaining an operation procedure of a charging system according to an embodiment of the present disclosure.
Figure 4B:
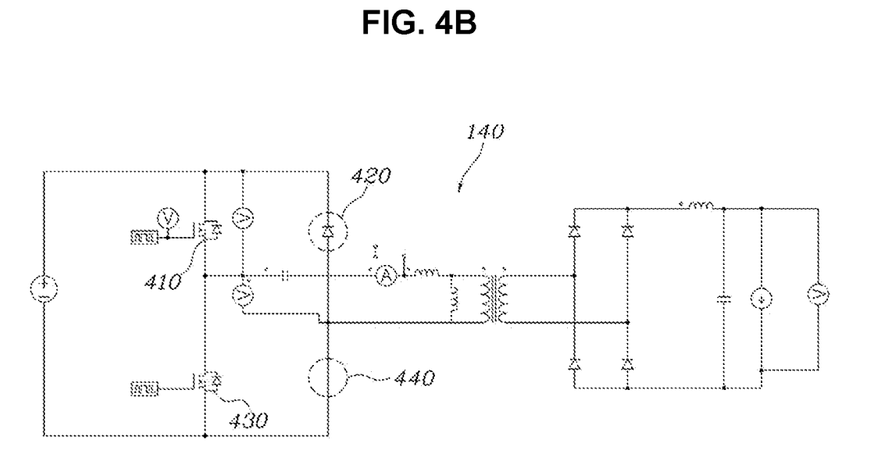

FIG. 4 is a diagram illustrating an example of DC-DC converters 141, 142, and 143 of which the topology can be modified in the form of a full bridge or a half bridge. Referring to FIG. 4, the converter according to the present embodiment may be a converter including a full-bridge structure in which the input terminal of the converter has first to fourth switches 410, 420, 430, and 440.

According to the converter including such a full-bridge structure, operations of the first to fourth switches 410, 420, 430, and 440 are controlled by the controller 180, and thus the topology modification in the form of a full bridge or a half bridge may be possible.

FIG. 4A illustrates a case that a DC-DC converter operates in the form of a full-bridge converter through a conventional full-bridge switching control (first switch/fourth switch control and second switch/third switch control), and FIG. 4B illustrates a case that the DC-DC converter operates in the form of a half-bridge converter in a manner that the second switch 420 is always turned off by the controller to make an effect of opening the connection parts of the second switch 420, and the fourth switch 440 is always turned on to make an effect of short-circuiting the connection parts of the fourth switch 440.

The plurality of swappable batteries 171, 172, and 173 are respectively connected to the DC-DC converters 141, 142, and 143 through the switches 161, 162, and 163. More specifically, referring to FIG. 2, since the first swappable battery 171 is connected to an input terminal of the first DC-DC converter 141 through the first switch 161, the second swappable battery 172 is connected to an input terminal of the second DC-DC converter 142 through the second switch 162, and the third swappable battery 173 is connected to an input terminal of the third DC-DC converter 143 through the third switch 163, voltages from the swappable batteries 171, 172, and 173 may be applied to the DC-DC converters 141, 142, and 143, respectively.

The plurality of switches 161, 162, and 163 may be opened or short-circuited under the control the controller 180 to make the voltages from the plurality of swappable batteries 171, 172, and 173 be applied or not applied to the plurality of DC-DC converters 141, 142, and 143, respectively.

If it is possible for the switches 161, 162, and 163 to control the applying of the voltages from the swappable batteries 171, 172, and 173, they can be properly selected and used by an ordinary skilled person.

According to an embodiment of the present disclosure, the switches 161, 162, and 163 may be composed of a plurality of relays. Referring to FIG. 2, the switches 161, 162, and 163 according to an embodiment of the present disclosure may be composed of three relays, and the relays may be a precharge relay having one end connected to each anode of the swappable batteries 171, 172, and 173 and initially charging the link capacitors 131, 132, and 133 connected to the other end of the relay, a first main relay having one end connected to the anode of the swappable batteries 171, 172, and 173, and a second main relay having one end connected to each cathode of the swappable batteries.

When charging of the main battery 150 by the swappable batteries 171, 172, and 173 starts, the precharge relay is first closed to initially charge the link capacitors 131, 132, and 133 connected thereto. Thereafter, if the charging of the connected link capacitors 131, 132, and 133 is completed, the precharge relay is opened, and the first main relay is closed, so that the voltages from the swappable batteries 171, 172, and 173 are applied to the DC-DC converters 141, 142, and 143.

Hereinafter, the operation of the charging system according to the embodiment illustrated in FIG. 2 will be described.

If the vehicle is currently charged by the commercial AC power 110 applied from the outside, the plurality of switches 161, 162, and 163 are opened by the control of the controller 180.

As the plurality of switches 161, 162, and 163 are opened, circuits between the plurality of swappable batteries 171, 172, and 173 and the plurality of DC-DC converters 141, 142, and 143 are opened, and thus the voltages from the plurality of swappable batteries 171, 172, and 173 are not applied to the plurality of DC-DC converters 141, 142, and 143, but the main battery 150 of the vehicle is charged by the external commercial AC power 110 converted by the plurality of DC-DC converters 141, 142, and 143.

Meanwhile, if the charging of the main battery 150 is required in a state where the commercial AC power 110 from the outside is absent, the plurality of switches 161, 162, and 163 are closed by the control of the controller 180.

As the plurality of switches 161, 162, and 163 are closed, the circuits between the plurality of swappable batteries 171, 172, and 173 and the plurality of DC-DC converters 141, 142, and 143 are short-circuited, and thus the voltages of the swappable batteries 171, 172, and 173 are applied to the DC-DC converters 141, 142, and 143 connected to the swappable batteries 171, 172, and 173 as inputs, and the main battery 150 of the vehicle is charged by the voltages of the plurality of swappable batteries 171, 172, and 173, having been converted by the plurality of DC-DC converters 141, 142, and 143.

In an embodiment of the present disclosure, the plurality of DC-DC converters 141, 142, and 143 may be controlled by the controller 180 so as to operate as converters in the form of a half bridge when the main battery 150 is charged by the commercial AC power 110, and may be controlled by the controller 180 so as to operate as converters in the form of a full bridge when the main battery 150 is charged by the plurality of swappable batteries 171, 172, and 173. As described above, since the operation form of the DC-DC converters is modified depending on charging sources for charging the main battery 150, the charging of the main battery by the different charging sources can be stably performed.

According to the charging system 100 according to the present embodiment, since the swappable batteries 171, 172, and 173 for charging the main battery 150 charge the main battery 150 through the DC-DC converter unit 140 converting the existing commercial AC power 110 without adding separate converters, the charging system is economical and has an excellent charging efficiency. In addition, since the power factor correction converter 121 having a boost converter structure performs the power factor correction of the external commercial AC power 110, the power factor can be increased, and the total harmonic distortion can be reduced.

Further, since the DC-DC converters 141, 142, and 143 are respectively connected to the plurality of link capacitors 131, 132, and 133 connected in series to the output terminal of the power factor correction converter 121, there is a technical effect that the voltages matching the swappable batteries 171, 172, and 173 can be applied to the DC-DC converters 141, 142, and 143, respectively.

Embodiment 2

Embodiment 2 is an embodiment in which the power factor correction unit 120 of FIG. 1 is composed of a plurality of converters. FIG. 3 is a diagram illustrating a charging system according to embodiment 2 of the present disclosure.

Referring to FIG. 2, a charging system according to an embodiment of the present disclosure is composed of a plurality of power factor correction converters 122, 123, and 124, a plurality of link capacitors 131, 132, and 133, a plurality of DC-DC converters 141, 142, and 143, a main battery 150, a plurality of switches 161, 162, and 163, and a plurality of swappable batteries 171, 172, and 173.

The plurality of power factor correction converters 122, 123, and 124 are composed of a plurality of buck converters connected in parallel to one another. In an embodiment of the present disclosure, the plurality of power factor correction converters 122, 123, and 124 may be configured as bridgeless topology.

In case that the buck converters are used as the power factor correction converters 122, 123, and 124, the plurality of link capacitors 131, 132, and 133 connected to output terminals of the buck converters may be used as film capacitors, and this may increase the lifespan of the charging system 100 and may increase the power density.

The plurality of link capacitors 131, 132, and 133 are connected in a one-to-one correspondence to the output terminals of the power factor correction converters 122, 123, and 124.

The controller 180 may control the voltages being applied to the link capacitors 131, 132, and 133 to match the voltages of the plurality of swappable batteries 171, 172, and 173. For example, in an embodiment of the present disclosure, if the voltages of the swappable batteries 171, 172, and 173 are 48V, the controller 180 may control the voltages being applied to the link capacitors 131, 132, and 133 to be 50V to 80V.

The plurality of DC-DC converters 141, 142, and 143 are coupled in a one-to-one correspondence to the link capacitors 131, 132, and 133, and the voltages being applied to both terminals of each of the link capacitors 131, 132, and 133 are applied to the input terminals of the DC-DC converters 141, 142, and 143.

Referring to FIG. 3, since the first DC-DC converter 141 is connected to receive an input of the voltage being applied to the first link capacitor 131 of the first power factor correction converter 131, the second DC-DC converter 142 is connected to receive an input of the voltage being applied to the second link capacitor 132 of the second power factor correction converter 132, and the third DC-DC converter 143 is connected to receive an input of the voltage being applied to the third link capacitor 133 of the third power factor correction converter 133, the link capacitors 131, 132, and 133 correspond to the DC-DC converters 141, 142, and 143 in a one-to-one manner.

The outputs of the plurality of DC-DC converters 141, 142, and 143 are connected in parallel to one another, and are input to the input terminal of the main battery 150.

The plurality of DC-DC converters 141, 142, and 143 may be composed of DC-DC converters of which the topology can be modified in the form of a full bridge or a half bridge, and if a detailed circuit form can be modified in the form of a full bridge or a half bridge under the control of the controller, it can be properly selected and used by an ordinary skilled person.

The plurality of swappable batteries 171, 172, and 173 are respectively connected to the DC-DC converters 141, 142, and 143 through the switches 161, 162, and 163. More specifically, referring to FIG. 3, since the first swappable battery 171 is connected to an input terminal of the first DC-DC converter 141 through the first switch 161, the second swappable battery 172 is connected to an input terminal of the second DC-DC converter 142 through the second switch 162, and the third swappable battery 173 is connected to an input terminal of the third DC-DC converter 143 through the third switch 163, voltages from the swappable batteries 171, 172, and 173 may be applied to the DC-DC converters 141, 142, and 143, respectively.

The plurality of switches 161, 162, and 163 may be opened or short-circuited under the control the controller 180 to make the voltages from the plurality of swappable batteries 171, 172, and 173 be applied or not applied to the plurality of DC-DC converters 141, 142, and 143, respectively.

If the vehicle is currently charged by the commercial AC power 110 applied from the outside, the plurality of switches 161, 162, and 163 are opened by the control of the controller 180.

As the plurality of switches 161, 162, and 163 are opened, circuits between the plurality of swappable batteries 171, 172, and 173 and the plurality of DC-DC converters 141, 142, and 143 are opened, and thus the voltages from the plurality of swappable batteries 171, 172, and 173 are not applied to the plurality of DC-DC converters 141, 142, and 143, but the main battery 150 of the vehicle is charged by the external commercial AC power 110 converted by the plurality of DC-DC converters 141, 142, and 143.

Meanwhile, if the charging of the main battery 150 is required in a state where the commercial AC power 110 from the outside is absent, the plurality of switches 161, 162, and 163 are closed by the control of the controller 180.

As the plurality of switches 161, 162, and 163 are closed, the circuits between the plurality of swappable batteries 171, 172, and 173 and the plurality of DC-DC converters 141, 142, and 143 are short-circuited, and thus the voltages of the swappable batteries 171, 172, and 173 are applied to the DC-DC converters 141, 142, and 143 connected to the swappable batteries 171, 172, and 173 as inputs, and the main battery 150 of the vehicle is charged by the voltages of the plurality of swappable batteries 171, 172, and 173, having been converted by the plurality of DC-DC converters 141, 142, and 143.

According to the charging system 100 according to the present embodiment, since the swappable batteries 171, 172, and 173 for charging the main battery 150 charge the main battery 150 through the DC-DC converter unit 140 converting the existing commercial AC power 110 without adding separate converters, the charging system is economical and has an excellent charging efficiency. In addition, since the plurality of power factor correction converters 122, 123, and 124 having buck converter structures perform the power factor correction of the external commercial AC power 110, the lifespan of the charging system can be increased.

Embodiment 3

Figure 5:
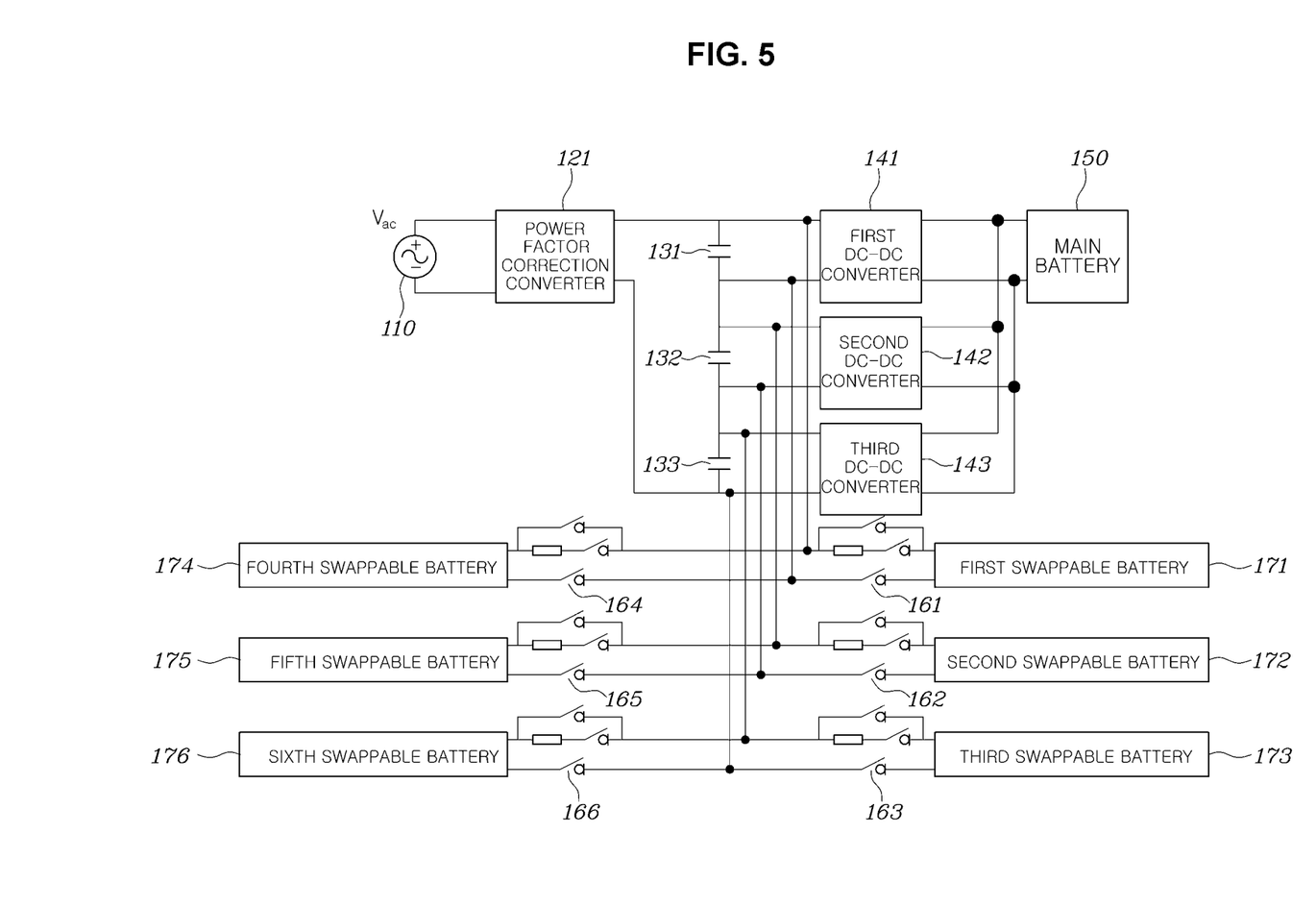
FIG. 5 is a diagram illustrating a charging system according to still another embodiment of the present disclosure.

Embodiment 3 represents an example of a charging system 100 in which a larger number of swappable batteries 171, 172, 173, 174, 175, and 176 than the number of DC-DC converters 141, 142, and 143 are installed.

FIG. 5 illustrates the configuration of a charging system according to embodiment 3. In embodiment 3, the number of swappable batteries 171, 172, 173, 174, 175, and 176 is increased in the charging system according to embodiment 1, and the configuration of the charging system is equal to the configuration according to embodiment 1 except for the number of swappable batteries 171, 172, 173, 174, 175, and 176.

Although a power factor correction unit 120 of embodiment 3 is illustrated as a single power factor correction converter 121 in FIG. 5, it will be apparent to an ordinary skilled person that the same effect can be obtained even if the power factor correction unit 120 is composed of a plurality of power factor correction converters 122, 123, and 124 as in embodiment 2.

Referring to FIG. 5, output terminals of the first swappable battery 171 and the fourth swappable battery 174, output terminals of the second swappable battery 172 and the fifth swappable battery 175, and output terminals of the third swappable battery 173 and the sixth swappable battery 176 are connected to one another. Input terminals of the DC-DC converters 141, 142, and 143 are connected to output terminals of pairs of the swappable batteries 171, 172, 173, 174, 175, and 176.

When a main battery 150 is charged through the plurality of swappable batteries 171, 172, and 173, the controller 180 may operate to alternately charge the main battery 150 in the pairs of the swappable batteries 171, 172, 173, 174, 175, and 176 by controlling the switches 161, 162, and 163, being connected to some swappable batteries (e.g., the first swappable battery, the second swappable battery, and the third swappable battery) among the pairs of the swappable batteries 171, 172, 173, 174, 175, and 176, to be closed, and controlling the switches 164, 165, and 166 of other swappable batteries (e.g., the fourth swappable battery, the fifth swappable battery, and the sixth swappable battery) to be opened.

As described above, in connecting the larger number of swappable batteries 171, 172, 173, 174, 175, and 176 than the number of DC-DC converters 141, 142, and 143 to the plurality of DC-DC converters 141, 142, and 143, the main battery is charged by alternately opening and closing the switches of the pairs of the swappable batteries 171, 172, 173, 174, 175, and 176 after connecting the output terminals of the pairs of the swappable batteries 171, 172, 173, 174, 175, and 176 to each other and connecting the connected output terminals to the input terminals of the plurality of DC-DC converters 141, 142, and 143, and thus the swappable batteries can be added without any work to separate the plurality of DC-DC converters 141, 142, and 143, so that the driving time of the vehicle can be increased economically and easily.

Figure 6:
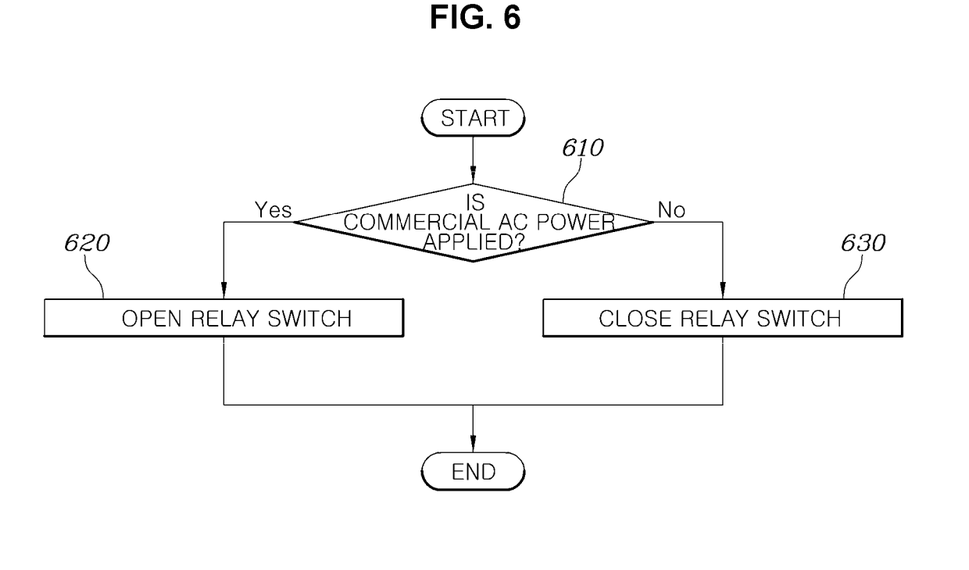
FIG. 6 is a flowchart illustrating a charging method according to an embodiment of the present disclosure.

FIG. 6 is a flowchart illustrating a method for charging a battery of a vehicle according to an embodiment of the present disclosure.

Referring to FIG. 6, in step 610, the controller 180 determined whether an external commercial AC power 110 is applied to the vehicle.

If it is determined that the external commercial AC power 110 is applied to the vehicle by the controller in step 610, the controller 180, in step 620, controls the plurality of switches 161, 162, and 163 connected to the plurality of swappable batteries 171, 172, and 173 to apply the power of the commercial AC power 110 to the main battery 150.

In an embodiment of the present disclosure, the controller 180 may control to apply the commercial AC power to the plurality of converters 141, 142, 143, and 144 by blocking connections between the plurality of swappable batteries 171, 172, and 173 and the plurality of DC-DC converters 141, 142, and 143 through opening of the switches through which the plurality of swappable batteries are connected to the plurality of DC-DC converters 141, 142, and 143 that convert the commercial AC power 110 into the voltages for charging the main battery 150.

In this case, the controller may control the DC-DC converters 141, 142, and 143 to operate as converters in the form of a half bridge by controlling the plurality of switches configured on the input terminals of the DC-DC converters 141, 142, and 143.

If it is determined that the external commercial AC power 110 is not applied to the vehicle by the controller in step 610, the controller 180, in step 630, may make the voltages by the plurality of swappable batteries 171, 172, and 173 be applied to the plurality of DC-DC converters 141, 142, and 143 by connecting between the plurality of swappable batteries 171, 172, and 173 and the plurality of DC-DC converters 141, 142, and 143 through closing of the plurality of switches connected to the plurality of swappable batteries 171, 172, and 173. The voltages of the plurality of swappable batteries 171, 172, and 173, being applied to the plurality of DC-DC converters 141, 142, and 143, are converted to charge the main battery 150.

In this case, the controller may control the DC-DC converters 141, 142, and 143 to operate as converters in the form of a full bridge by controlling the plurality of switches configured on the input terminals of the DC-DC converters 141, 142, and 143.

According to the system and the method for charging a battery of a vehicle according to embodiments of the present disclosure, since it is possible to charge the main battery with the voltages of the swappable batteries using the DC-DC converters of the OBC without installing additional converters for the plurality of swappable batteries through connection of the plurality of swappable batteries to the input terminals of the plurality of DC-DC converters of the OBC charging the main battery, the driving distance of the vehicle is increased, and the efficiency of the motor and the inverters is increased.

Up to now, the present disclosure has been described around the preferred embodiments. Those of ordinary skill in the art will be able to understand that the present disclosure can be implemented in modified forms within the scope that does not depart from the intrinsic characteristics of the present disclosure. Accordingly, the disclosed embodiments should not be considered from the viewpoint of limitation, but should be considered from the viewpoint of explanation. The scope of the present disclosure is not presented in the above description, but is presented in appended claims, and all differences within an equivalent range should be interpreted to be included in the present disclosure.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A system for charging a battery of a vehicle, the system comprising:
   a power factor correction unit configured to receive a commercial AC power being applied, and configured to correct a power factor of the AC power;
   a plurality of link capacitors coupled to an output terminal of the power factor correction unit;
   a plurality of converters each having input terminals connected to each of the plurality of link capacitors in a one-to-one correspondence, and configured to convert voltages applied to the input terminals;
   a main battery configured to be charged with powers converted by the plurality of converters;
   a plurality of swappable batteries connected to the input terminals of the converters using switches; and
   a controller applying the commercial AC power or voltages by the plurality of swappable batteries to the input terminals of the plurality of converters by controlling the switches of the plurality of swappable batteries depending on whether the commercial AC power is applied.

2. The system according to claim 1, wherein the plurality of converters are DC-DC converters, of which a topology can be modified in the form of a full bridge or a half bridge under the control of the controller.

3. The system according to claim 2, wherein the controller is configured to control the plurality of converters to operate as half-bridge converters when the commercial AC power is applied to the plurality of converters.

4. The system according to claim 2, wherein the controller is configured to control the plurality of converters to operate as full-bridge converters when the voltages of the plurality of swappable batteries are applied to the plurality of converters.

5. The system according to claim 1, wherein the power factor correction unit has a structure of a boost converter, and
   the plurality of link capacitors are connected in series at an output terminal of the boost converter.

6. The system according to claim 1, wherein the power factor correction unit has a structure of a plurality of buck converters, and
   the plurality of link capacitors are each connected to an output terminal of the buck converters.

7. The system according to claim 1, wherein the controller is configured to control the switches to be opened to charge the main battery with the commercial AC power when the commercial AC power is applied to the vehicle.

8. The system according to claim 1, wherein the controller is configured to control the switches to be closed to charge the main battery through the plurality of swappable batteries when the commercial AC power is not applied to the vehicle.

9. The system according to claim 1, wherein the switches connected to the swappable batteries each comprise a plurality of relays,
   wherein the plurality of relays include a precharge relay having one end connected to an anode of the swappable battery and initially charging the plurality of link capacitors, a first main relay having one end connected to the anode of the swappable battery, and a second main relay having one end connected to a cathode of the swappable battery, and
   the first main relay and the second main relay apply the voltages of the swappable batteries to the input terminals of the converters under the control of the controller.

10. The system according to claim 1, wherein outputs of the converters are connected in parallel to the main battery.

11. The system according to claim 1, wherein the plurality of swappable batteries comprise a plurality of swappable battery pairs, and wherein the swappable batteries of the plurality of swappable battery pairs have output terminals connected to one another, and the output terminals connected to one another are connected to the input terminals of the converters.

12. The system according to claim 11, wherein the controller makes two swappable batteries of the swappable battery pairs alternately charge the main battery by alternately opening and closing the switches of the two swappable batteries.

13. A method for charging a main battery of a vehicle, the method comprising:
- determining, by a controller, whether a commercial AC power is applied to the vehicle;
- applying, by the controller, the commercial AC power to a plurality of converters by opening switches through which a plurality of swappable batteries are connected to a plurality of converters converting the commercial AC power into voltages for charging the main battery when it is determined that the commercial AC power has been applied to the vehicle; and
- applying, by the controller, the voltages of the swappable batteries to the plurality of converters by closing the switches when it is determined that the commercial AC power has not been applied to the vehicle.

14. The method according to claim 13, wherein the plurality of converters are DC-DC converters of which a topology can be modified in the form of a full bridge or a half bridge under the control of the controller,
- wherein the applying the commercial AC power to the plurality of converters includes controlling, by the controller, the plurality of converters to operate as half-bridge converters, and
- wherein the applying the voltages of the swappable batteries to the plurality of converters includes controlling, by the controller, the plurality of converters to operate as half-bridge converters.

* * * * *